(12) United States Patent
Bok et al.

(10) Patent No.: US 7,828,332 B2
(45) Date of Patent: Nov. 9, 2010

(54) SEAT BELT TENSIONER

(75) Inventors: Chang Kyu Bok, Gwangmyeong-si (KR); Jang Chun Kong, Changwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 12/336,295

(22) Filed: Dec. 16, 2008

(65) Prior Publication Data
US 2009/0261569 A1    Oct. 22, 2009

(30) Foreign Application Priority Data
Apr. 22, 2008    (KR) .................... 10-2008-0037347

(51) Int. Cl.
*B60R 23/36* (2006.01)
(52) U.S. Cl. .................. 280/806; 280/807; 180/268; 242/374; 297/470; 297/480
(58) Field of Classification Search .......... 280/806, 280/807; 242/374; 297/470, 480
See application file for complete search history.

(56) References Cited

U.S. PATENT DOCUMENTS

| | | | | |
|---|---|---|---|---|
| 5,707,080 A * | 1/1998 | Isaji et al. | ..... | 280/806 |
| 5,794,978 A * | 8/1998 | Nishide | ..... | 280/806 |
| 5,863,009 A * | 1/1999 | Bauer et al. | ..... | 242/374 |
| 6,039,353 A * | 3/2000 | Bauer et al. | ..... | 280/806 |
| 6,851,715 B2 * | 2/2005 | Devereaux et al. | ..... | 280/806 |
| 7,168,742 B2 * | 1/2007 | Tomita | ..... | 280/806 |
| 7,188,868 B2 * | 3/2007 | Yamaguchi | ..... | 280/806 |
| 7,380,832 B2 * | 6/2008 | Gray et al. | ..... | 280/806 |
| 2003/0090101 A1 | 5/2003 | Ennerdal | | |
| 2005/0151365 A1 * | 7/2005 | Nakayama et al. | ..... | 280/806 |

FOREIGN PATENT DOCUMENTS

JP    08-164821    6/1996
JP    2003-127829 A    5/2003

* cited by examiner

*Primary Examiner*—Toan C To
(74) *Attorney, Agent, or Firm*—Morgan, Lewis & Bockius LLP

(57) ABSTRACT

A seat belt tensioner includes a guide, which has a pair of opposing plates connected by a connector, a wire, a first end of which extends upward to be connected to a seat belt, a central portion of which is curved to extend around the connector, and a retracting mechanism, which is connected to the second end of the wire and is operated by an external signal in an emergency. Here, the connector is integrally formed with at least one of the plates. Thus, the seat belt tensioner enables structural simplification, easy assembly, and a reduction in the number of parts.

6 Claims, 4 Drawing Sheets

SEAT BELT TENSIONER

CROSS-REFERENCE TO RELATED APPLICATION

This application claims priority to Korean Application No. 10-2008-0037347 filed Apr. 22, 2008, the entire contents of which is incorporated herein for all purposes by this reference.

BACKGROUND OF THE INVENTION

1. Field of the Invention

The present invention relates, in general, to a seat belt tensioner that increases the restraining force of a seat belt in order to protect a passenger in the event that a vehicle is involved in a collision.

2. Description of Related Art

In the event that a vehicle is involved in a collision, a passenger is often thrown forward with a considerable force, even when wearing a seat belt. A seat belt tensioner is a mechanism that increases the restraining force of a seat belt to protect the passenger before this forward throwing phenomenon occurs.

A seat belt tensioner will generally be described with reference to the seat belt mechanism shown in FIG. 1.

Typically, the seat belt mechanism is designed so that, when a buckle tongue 3 of the seat belt is fastened to a buckle 4 fixed on the side of a seat 1, an upper belt B1 restrains a passenger from the shoulder to the waist across the chest, and a lower belt B2 restrains the waist of the passenger. A belt tensioner 5 is connected to the upper belt B1, and is mounted in a center pillar trim 2. The lower belt B2 is fixedly installed below the belt tensioner 5 in the center pillar trim 2.

In this manner, when the belt tensioner 5 is installed on the upper belt B1 only, the upper belt B1 is first tensioned by the belt tensioner 5 in the event of the collision, and then the lower belt B2 performs restraint. Thus, according to the circumstances, the lower belt B2 is loose in spite of the operation of the belt tensioner 5, so that the hips and knees of the passenger move forward. In order to solve this problem, it is necessary to install the belt tensioner 5 on either the buckle 4 or the fixed end of the lower belt B2. The present invention particularly relates to a belt tensioner 5 that is to be mounted at this position.

Meanwhile, in conjunction with the present invention, Japanese Patent Application Publication No. 1996-164821 (published on Jun. 28, 1996), and U.S. Patent Application Publication No. 2003-0090101 (published on May 15, 2003) can be referred to as cross references.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Accordingly, various aspects of the present invention has been made keeping in mind the above problems and provide for a seat belt tensioner capable of rapidly pulling a lower belt, i.e. a waist belt, in an emergency to protect a passenger.

Other aspects of the present invention provide for a seat belt tensioner which is structurally simple and easy to assemble.

Other aspects of the present invention provide for a seat belt tensioner having a reduced number of parts.

Various aspects of the present invention are directed to a seat belt tensioner including a guide having a pair of opposing plates connected by a connector, a wire, a first end of which extends upward to be connected to a seat belt, and a central portion of which is curved to extend around the connector, and/or a retracting mechanism, which is connected to a second end of the wire and is operated by an external signal in an emergency. The connector may be integrally formed with at least one of the plates.

The connector may be formed by a burring process, in which one of the plates is provided with a hole and is then forcibly pressed to protrude around the hole.

The at least one of the plates may include at least one segmented flange, which supports the wire extending around the connector on an outer side of the wire.

The first end of the wire may be surrounded by a helical spring in order to increase linearity thereof.

The spring may include a horizontal extension at a lower end thereof which supports one end of the wire at an oblique angle.

The pair of plates may be fastened to each other by a plurality of fastening members, and the horizontal extension part is placed on the fastening members and further includes a hook engaging one of the fastening members.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
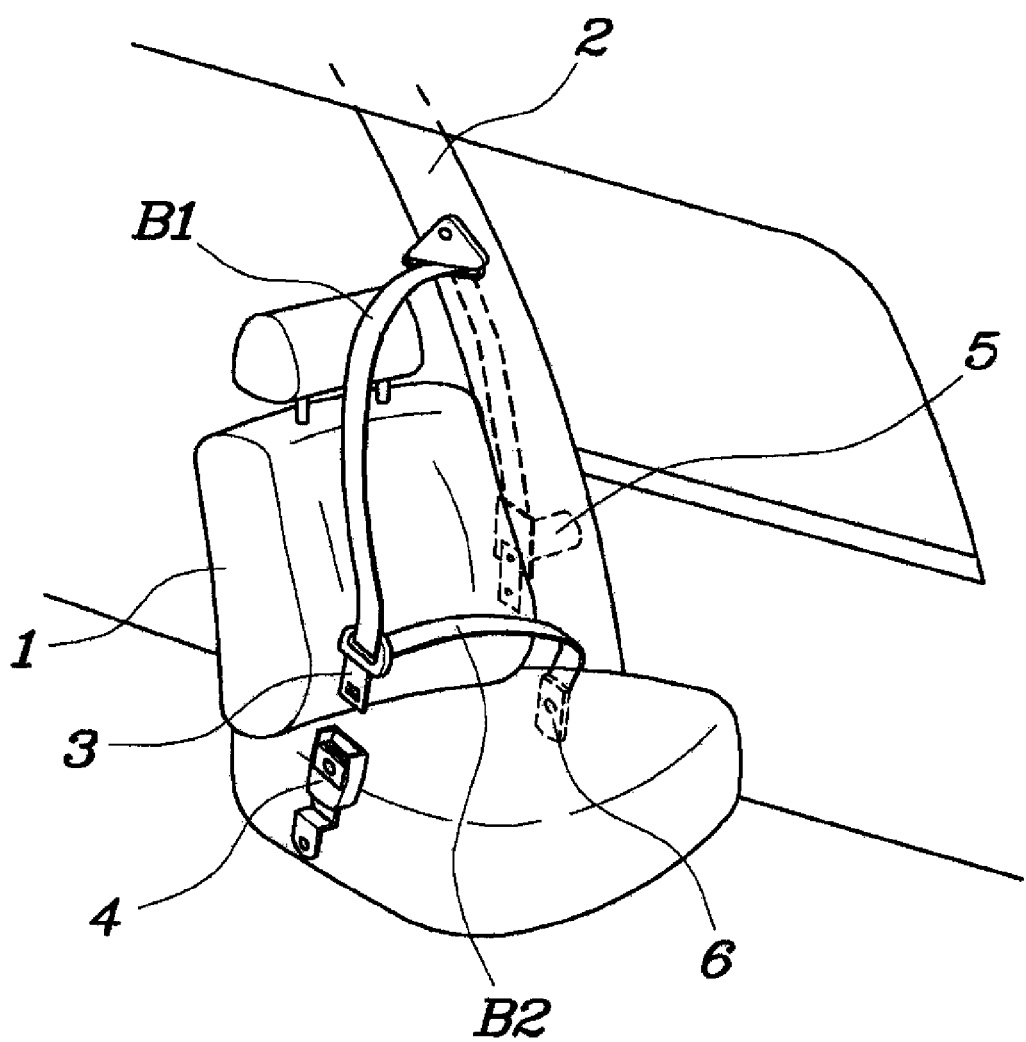
FIG. 1 illustrates a seat belt mechanism having a seat belt tensioner.

It should be understood that the appended drawings are not necessarily to scale and present a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
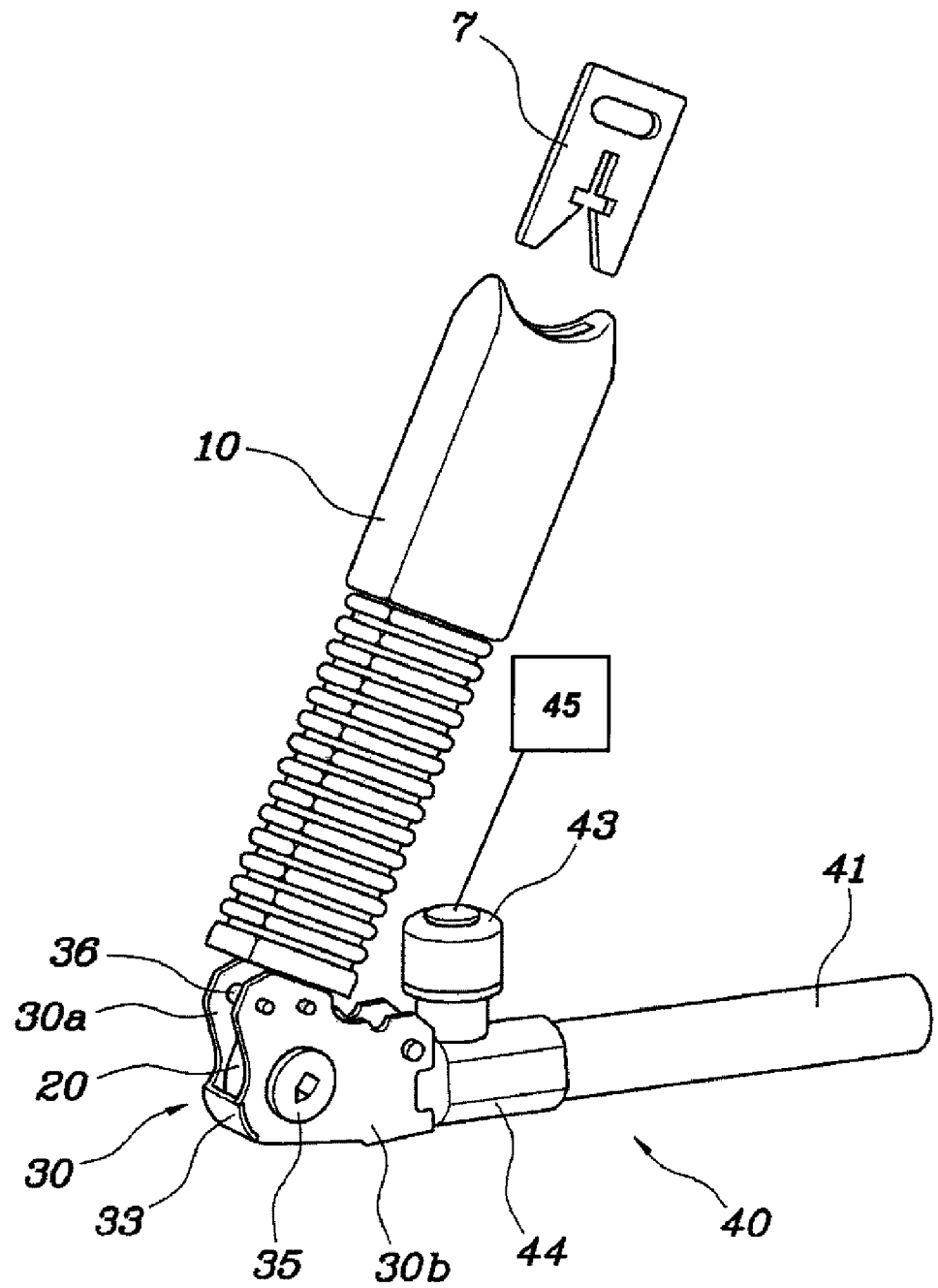
FIG. 2 illustrates a seat belt tensioner according to various aspects of the present invention.
Figure 3:
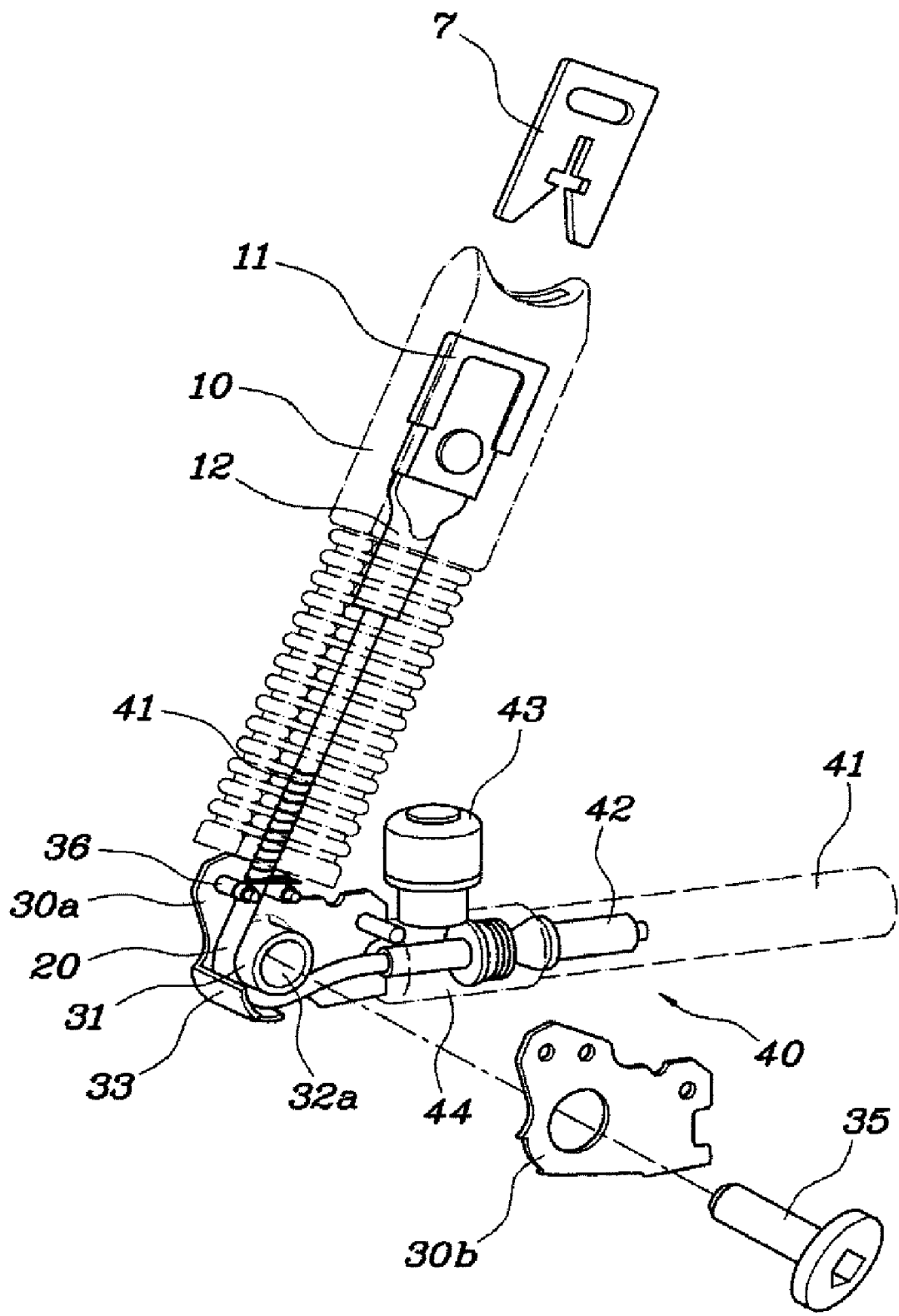
FIG. 3 illustrates the internal structure of the seat belt tension of FIG. 2.
Figure 4:
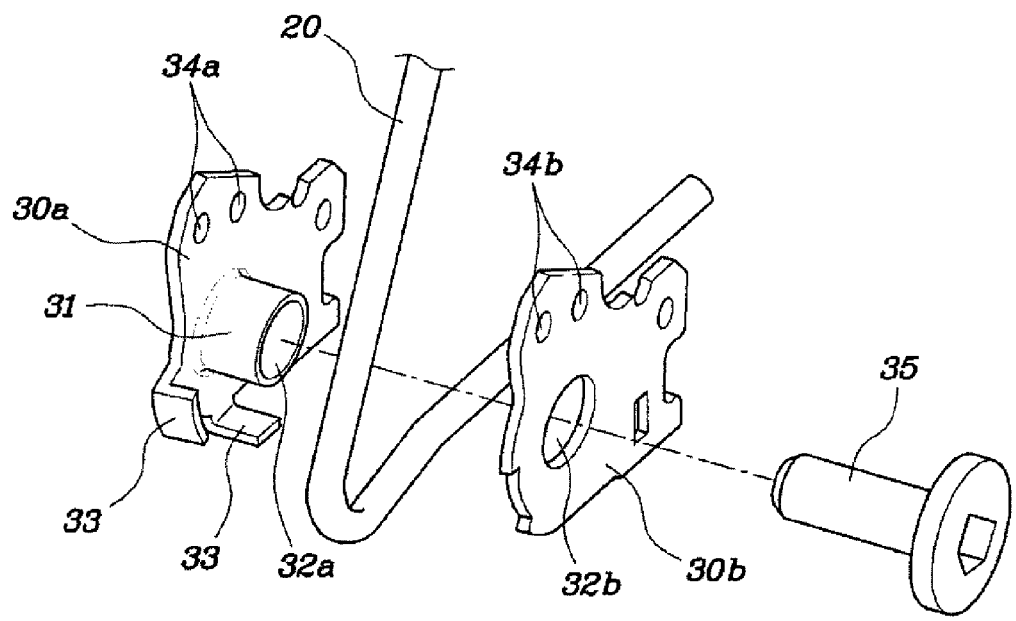
FIG. 4 is an exploded perspective view illustrating the guide of the of the seat belt tension of FIG. 3.

As for the entire structure of a seat belt tensioner illustrated in FIGS. 2 through 4, the seat belt tensioner generally comprises a wire 20, one end of which is connected to a seat belt (e.g., B2), a guide 30, around which the wire 20 is guided, and a retracting mechanism 40, which is connected to the other end of the wire 20.

The wire 20 is required to be rigid in a longitudinal direction. For example, the wire 20 can be a steel wire rope, comprising several stands of twisted wire. One end of the wire 20 extends upwards to be connected to a buckle 11 via a coupler 12. The buckle 11 is coupled with a buckle tongue 7 connected to a lower belt (e.g., B2). Alternatively, one end of the wire 20 may be simply fixedly connected to the lower belt via the coupler 12, instead of the connection between the buckle and the buckle tongue. One end of the wire 20 is housed in a housing 10. One end of the wire 20 is surrounded by a spring 50. This spring 50 will be described below.

The guide 30 functions to fix the seat belt tensioner to a vehicle (e.g. the seat or the inside of a center pillar). This guide 30 causes one end of the wire 20 to be turned at an acute angle with respect to the other end of the wire 20 and to thereby be in line with the lower belt. This guide 30 has a structure in which a pair of opposing plates 30a and 30b is interconnected by a connector 31. This connector 31 is formed by a burring process, in which the first plate 30a is provided with a hole 32a when manufactured, and is then forcibly pressed to protrude around the hole 32a. One will appreciate that other suitable metal forming processes may be utilized such as deep drawing.

The wire 20 is wound on the outer circumference of the connector 31 of the guide 30. The first plate 30a is provided with at least one segmented flange 33, which supports the wire 20 running or extending around the connector 31 on the outer side of the wire 20. When abruptly pulled by the retracting mechanism 40, the wire 20 causes proper frictional force with the connector 31 and the segmented flange 33, and thus pulls the lower belt at a proper speed. Meanwhile, the connector 31 may be replaced with a member such as a roller. In this case, the roller must be separately manufactured, and must then be assembled with the plates 30a and 30b. As such, the roller leads to a complicated assembly, high costs, and the potential of a malfunction. In contrast, when the connector 31 is integrally formed with the plates 30a and 30b through the burring process, this leads to a simpler structure, quicker assembly, lower costs, and better performance than in the case of the roller.

Meanwhile, the second plate 30b is provided with a hole 32b corresponding to the hole 32a in the connector 31. The first plate 30a is fastened to the second plate 30b by a rivet 35, which passes through the hole 32a in the connector 31 and the hole 32b. Further, the plates 30a and 30b are provided with respective through-holes 34a and 34b, through which rivets 36 are fastened.

In the event of an emergency situation, such as a vehicle collision, the retracting mechanism 40 pulls the other end of the wire 20, so that the lower belt is pulled toward the guide 30. The other end of the wire 20 is connected to a piston 42 in a cylinder 41. A gas generator 43 and a gas cartridge 44 are installed between the cylinder 41 and the guide 30, which gas generator may be activated in response to an emergency by an external signal S from a controller 45 or other suitable device.

The gas generator 43 and the gas cartridge 44 are operated in an emergency, thereby forcing the piston 42 to be instantaneously pushed backward by gas pressure. One will appreciate that retracting mechanism 40 can be variously configured.

Figure 5:
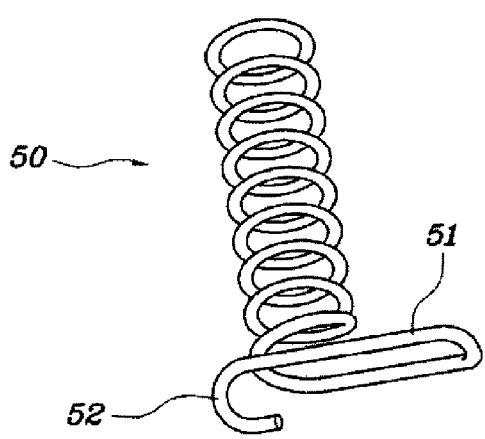
FIG. 5 illustrates the spring of a seat belt tensioner according to various aspects of the present invention.
Figure 6:
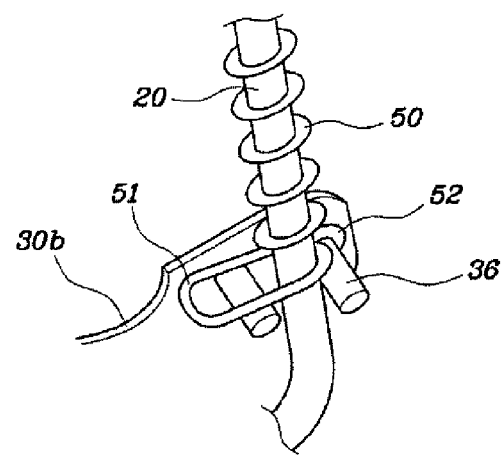
FIG. 6 illustrates the state in which the spring of FIG. 5 is mounted on a seat belt tensioner.

The spring 50, surrounding one end of the wire 20, will be described with reference to FIGS. 5 and 6.

The spring 50, serving to increase the linearity of one end of the wire 20, has a spirally coiled shape. Meanwhile, the spring 50 has a horizontal extension part 51 at a lower end thereof which supports one end of the wire 20 at an oblique angle. The horizontal extension part 51 extends perpendicular to the longitudinal direction of the spring 50, and is longer than the radius of the remaining turns of the spring 50. This horizontal extension part 51 is placed on the rivets 36, connecting the upper ends of the plates 30a and 30b of the guide 30, and allows one end of the wire 20 to maintain a constant angle without leaning toward the other end of the wire 20 (i.e. in the direction in which one end of the wire 20 moves away from the other end of the wire 20). Further, the horizontal extension part 51 of the spring 50 has a hook 52, which engages, an in various embodiments is hooked on one of the rivets 36 such that one end of the wire 20 can constantly maintain an oblique angle.

Although an exemplary embodiment of the present invention has been described for illustrative purposes, those skilled in the art will appreciate that various modifications, additions and substitutions are possible, without departing from the scope and spirit of the invention as disclosed in the accompanying claims.

For convenience in explanation and accurate definition in the appended claims, the terms "upper", "lower", "inside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A seat belt tensioner comprising:
   a guide having a pair of opposing plates connected by a cylindrical connector;
   a wire, a first end of which extends upward to be connected to a seat belt, and a central portion of which is curved to extend around the connector and directly contacted with an outer surface of the connector; and
   a retracting mechanism, which is connected to a second end of the wire and is operated by an external signal in an emergency,
   wherein the connector is integrally formed with at least one of the plates, and
   wherein the first end of the wire is surrounded by a helical spring in order to increase linearity thereof.

2. The seat belt tensioner as set forth in claim 1, wherein the connector is formed by a burring process, in which one of the plates is provided with a hole and is then forcibly pressed to protrude around the hole.

3. The seat belt tensioner as set forth in claim 1, wherein the at least one of the plates includes at least one segmented flange, which supports the wire extending around the connector on an outer side of the wire.

4. The seat belt tensioner as set forth in claim 1, wherein the spring includes a horizontal extension at a lower end thereof which supports one portion of the wire at an oblique angle.

5. The seat belt tensioner as set forth in claim 4, wherein the pair of plates is fastened to each other by a plurality of fastening members, and the horizontal extension part is placed on the fastening members and further includes a hook engaging one of the fastening members.

6. A seat belt tensioner, comprising:
- a guide having a pair of opposing plates connected by a connector;
- a wire, a first end portion of which extends upward to be connected to a seat belt, and a central portion of which is curved to extend around the connector and directly contacted with an outer surface of the connector; and
- a retracting mechanism, which is connected to a second end portion of the wire and is operated by an external signal in an emergency;
- wherein the connector is integrally formed with at least one of the plates;
- wherein the first end portion of the wire is surrounded by and coupled to a helical spring in order to increase axial linearity along longitudinal axis of the wire; and
- wherein the spring includes a horizontal extension at a lower end portion thereof which extends along the second end portion of the wire with a predetermined distance and elastically supports one portion of the wire at an oblique angle inclined with respect to longitudinal axis of the first end portion of the wire to increase horizontal linearity of the wire and is coupled to the guide, the predetermined distance being larger than a diameter of the helical spring.

* * * * *